United States Patent
Islam et al.

(10) Patent No.: US 10,595,322 B2
(45) Date of Patent: Mar. 17, 2020

(54) BEAMFORMING AND USER EQUIPMENT GROUPING

(71) Applicant: QUALCOMM Incorporated, San Diego, CA (US)

(72) Inventors: Muhammad Nazmul Islam, Edison, NJ (US); Sundar Subramanian, Bridgewater, NJ (US); Juergen Cezanne, Ocean Township, NJ (US); Krishna Kiran Mukkavilli, San Diego, CA (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 15/197,523

(22) Filed: Jun. 29, 2016

(65) Prior Publication Data
US 2017/0150510 A1 May 25, 2017

Related U.S. Application Data

(60) Provisional application No. 62/258,937, filed on Nov. 23, 2015.

(51) Int. Cl.
*H04W 72/08* (2009.01)
*H04B 7/06* (2006.01)
(Continued)

(52) U.S. Cl.
CPC ........ *H04W 72/085* (2013.01); *H04B 7/0617* (2013.01); *H04B 7/0643* (2013.01);
(Continued)

(58) Field of Classification Search
None
See application file for complete search history.

(56) References Cited

U.S. PATENT DOCUMENTS

| 7,729,325 B2 | 6/2010 | Gopalakrishnan et al. |
| 9,100,840 B2 | 8/2015 | Campos et al. |
| (Continued) | | |

FOREIGN PATENT DOCUMENTS

WO WO-2015109153 A1 7/2015

OTHER PUBLICATIONS

ISA/EP, International Search Report and Written Opinion of the International Searching Authority, Int'l Application No. PCT/US2016/059645, dated Jan. 30, 2017, European Patent Office, Rijswijk, NL, 10 pgs.

*Primary Examiner* — Robert C Scheibel
(74) *Attorney, Agent, or Firm* — Holland & Hart LLP

(57) ABSTRACT

Methods, systems, and apparatuses are described for wireless communication at a base station. The base station may transmit a control message to a set of user equipments (UEs) using a directional transmission having a first beamform width. The base station may exchange, according to the control message, data messages with a first UE of the set of UEs using a directional transmission having a second beamform width. The second beamform width may be different from the first beamform width. The base station may exchange, according to the control message, data messages with a second UE of the set of UEs using a directional transmission having a third beamform width. The third beamform width may be different from the first beamform width, the second beamform width, or both.

39 Claims, 10 Drawing Sheets

(51) Int. Cl.
*H04L 5/00* (2006.01)
*H04W 16/28* (2009.01)
*H04W 72/04* (2009.01)
*H04W 74/08* (2009.01)

(52) U.S. Cl.
CPC ............ *H04L 5/006* (2013.01); *H04W 16/28* (2013.01); *H04W 72/042* (2013.01); *H04W 72/0413* (2013.01); *H04W 72/0446* (2013.01); *H04W 74/0833* (2013.01)

(56) References Cited

U.S. PATENT DOCUMENTS

| | | | |
|---|---|---|---|
| 9,294,163 B2 | 3/2016 | Kim | |
| 9,629,171 B2* | 4/2017 | Roy | H04W 72/085 |
| 2005/0261028 A1* | 11/2005 | Chitrapu | H04B 7/0408 |
| | | | 455/562.1 |
| 2008/0219194 A1* | 9/2008 | Kim | H04B 7/0452 |
| | | | 370/310 |
| 2013/0057432 A1* | 3/2013 | Rajagopal | H01Q 3/26 |
| | | | 342/368 |
| 2013/0229307 A1 | 9/2013 | Chang et al. | |
| 2013/0286960 A1* | 10/2013 | Li | H04W 72/042 |
| | | | 370/329 |
| 2014/0225775 A1 | 8/2014 | Clevorn et al. | |
| 2015/0381396 A1* | 12/2015 | Chen | H04W 74/08 |
| | | | 370/254 |
| 2016/0028521 A1* | 1/2016 | Shimezawa | H04J 11/005 |
| | | | 370/329 |
| 2016/0047885 A1* | 2/2016 | Wang | G01S 3/74 |
| | | | 342/442 |
| 2016/0286407 A1* | 9/2016 | Simonsson | H01Q 1/246 |
| 2016/0323894 A1* | 11/2016 | Shen | H04B 7/04 |
| 2018/0103469 A1* | 4/2018 | Cave | H04L 5/0073 |
| 2018/0123669 A1* | 5/2018 | Xi | H04B 7/04 |

* cited by examiner

BEAMFORMING AND USER EQUIPMENT GROUPING

CROSS REFERENCE

The present Application for Patent claims priority to U.S. Provisional Patent Application No. 62/258,937 by Islam et al., entitled "Beam Forming and User Equipment Grouping," filed Nov. 23, 2015, assigned to the assignee hereof.

BACKGROUND

Field of the Disclosure

The present disclosure, for example, relates to wireless communication systems, and more particularly to beamforming and user equipment grouping.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some wireless communication systems may employ beamforming or spatial filtering techniques where signals are transmitted in a directional manner. Beamforming may be achieved by the selection of particular antenna elements for a transmission to achieve constructive interference in the direction of transmission. The width of the beamformed signals determine the amount of gain, at the expense of selectivity. That is, a wider beamform width reduces gain, but captures more receivers (e.g., has a wider geographical coverage area). Alternatively, a more narrow beamform signal increases gain, but reduces the amount of captured receivers (e.g., has a smaller geographical coverage area).

SUMMARY

The described features generally relate to improved techniques to provide beamforming and user equipment (UE) grouping. For example, the described techniques provide for a base station to group UEs within its coverage area into UE sets based on the location, channel condition, amount of data scheduled for transmission, etc. of the UEs. The base station may then transmit control messages to a set of UEs using a directional transmission. The control messages may be transmitted with a certain beamform width. The base station may then exchange data messages with individual UEs from the set of UEs also using directional transmissions. The beamform width of the directional transmissions used for the data messages may be different from each other, different from the beamform width of the control messages, or both. In some examples, the beamform width used for the control message directional transmissions may be wider than the beamform widths used for the data message directional transmissions.

A method for wireless communication is described. The method may include: transmitting one or more user-specific control messages to a corresponding one or more UEs using a single directional transmission having a first beamform width; exchanging, according to the user-specific control messages, a data message with a first UE of the one or more UEs using a directional transmission having a second beamform width which is different from the first beamform width; and exchanging, according to the user-specific control messages, a data message with a second UE of the one or more UEs using a directional transmission having a third beamform width which is different from at least one of the first beamform width and the second beamform width.

The second beamform width and the third beamform width may be narrower than the first beamform width. The method may include selecting the one or more UEs based at least in part on a channel metric associated with a plurality of UEs in a cell coverage area. The channel metric may include an angle of arrival parameter associated with transmissions from each of the plurality of UEs. The channel metric may include a signal-to-noise ratio (SNR) associated with transmissions to each of the plurality of UEs. The channel metric may include one or more received signal strength indicators (RSSI), a reference signal received power, and a reference signal received quality associated with transmissions to each of the plurality of UEs. The channel metric may include an angle of departure parameter associated with transmissions to each of the plurality of UEs. The method may include selecting the one or more UEs based at least in part on a data demand associated with a plurality of UEs in a cell coverage area.

The method may include: receiving, from each of a plurality of UEs, a feedback message may include directional information for each of the plurality of UEs; and selecting the one or more UEs based at least in part on the directional information. The feedback message may be received in a directional random access channel. The feedback message may be received through uplink control information (UCI). The UCI may be received via a physical uplink control channel (PUCCH). The UCI may be received via a physical uplink shared channel (PUSCH). The feedback message may be received in a channel quality indicator (CQI) feedback message.

The method may include: transmitting one or more directional primary synchronization signals to a plurality of UEs; receiving feedback information from each of the plurality of UEs, the feedback information based at least in part on the one or more directional primary synchronization signals; and selecting the one or more UEs based at least in part on the feedback information. The method may include: transmitting one or more directional tracking messages to corresponding individual UEs of a plurality of UEs, the one or more directional tracking messages each conveying a request to the corresponding UEs to provide feedback information; receiving, responsive to the one or more directional tracking messages, feedback information from each of the corresponding individual UEs; and selecting the one or more UEs based at least in part on the feedback information.

The data message exchanged with the second UE may be exchanged in a different time slot than the data message exchanged with the first UE. The data message exchanged with the second UE may be exchanged in a same time slot as the data message exchanged with the first UE. The user-specific control messages may be communicated via a Physical Downlink Control Channel (PDCCH).

An apparatus for wireless communication is described. The apparatus may include: a processor; memory in electronic communication with the processor; and instructions stored in the memory, the instructions being executable by the processor to: transmit one or more user-specific control messages to a corresponding one or more UEs using a single directional transmission having a first beamform width; exchange, according to the user-specific control messages, a data message with a first UE of the one or more UEs using a directional transmission having a second beamform width which is different from the first beamform width; and exchange, according to the user-specific control messages, a data message with a second UE of the one or more UEs using a directional transmission having a third beamform width which is different from at least one of the first beamform width and the second beamform width.

The second beamform width and the third beamform width may be narrower than the first beamform width. The instructions are further executable by the processor to select the one or more UEs based at least in part on a channel metric associated with a plurality of UEs in a cell coverage area. The channel metric may include an angle of arrival parameter associated with transmissions from each of the plurality of UEs. The channel metric may include an SNR associated with transmissions to each of the plurality of UEs. The apparatus may include instructions executable by the processor to select the one or more UEs based at least in part on a data demand associated with a plurality of UEs in a cell coverage area. The instructions are further executable by the processor to: receive, from each of a plurality of UEs, a feedback message that may include directional information for each of the plurality of UEs; and select the one or more UEs based at least in part on the directional information. The feedback message may be received in a directional random access channel. The feedback message may be received in a CQI feedback message.

The instructions are further executable by the processor to: transmit one or more directional primary synchronization signals to a plurality of UEs; receive feedback information from each of the plurality of UEs, the feedback information based at least in part on the one or more directional primary synchronization signals; and select the one or more UEs based at least in part on the feedback information. The instructions are further executable by the processor to: transmit one or more directional tracking messages to corresponding individual UEs of a plurality of UEs, the one or more directional tracking messages each conveying a request to the corresponding UEs to provide feedback information; receive, responsive to the one or more directional tracking messages, feedback information from each of the corresponding individual UEs; and select the one or more UEs based at least in part on the feedback information.

The data message exchanged with the second UE may be exchanged in a different time slot than the data message exchanged with the first UE. The data message exchanged with the second UE may be exchanged in a same time slot as the data message exchanged with the first UE.

An apparatus for wireless communication is described. The apparatus may include: means for transmitting one or more user-specific control messages to a corresponding one or more UEs using a single directional transmission having a first beamform width; means for exchanging, according to the user-specific control messages, a data message with a first UE of the one or more UEs using a directional transmission having a second beamform width which is different from the first beamform width; and means for exchanging, according to the user-specific control messages, a data message with a second UE of the one or more UEs using a directional transmission having a third beamform width which is different from at least one of the first beamform width and the second beamform width.

The second beamform width and the third beamform width may be narrower than the first beamform width. The apparatus may include means for selecting the one or more UEs based at least in part on a channel metric associated with a plurality of UEs in a cell coverage area.

A non-transitory computer-readable medium storing computer-executable code for wireless communication is described. The code executable by a processor to: transmit one or more user-specific control messages to a corresponding one or more UEs using a directional transmission having a first beamform width; exchange, according to the user-specific control messages, a data message with a first UE of the one or more UEs using a directional transmission having a second beamform width which is different from the first beamform width; and exchange, according to the user-specific control messages, a data message with a second UE of the one or more UEs using a directional transmission having a third beamform width which is different from at least one of the first beamform width and the second beamform width.

The second beamform width and the third beamform width may be narrower than the first beamform width. The code is executable by the processor to select the one or more UEs based at least in part on a channel metric associated with a plurality of UEs in a cell coverage area. The channel metric may include an angle of arrival parameter associated with transmissions from each of the plurality of UEs. The channel metric may include a signal-to-noise ratio (SNR) associated with transmissions to each of the plurality of UEs.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Conventional beamforming techniques may include a transmitter transmitting directional signals in different directions, e.g., periodic directional synchronization signals, directional tracking signals during data transmission, etc. The width of the beamformed signal determines the amount of gain (or usable signal strength at the receiver) which determines the modulation and coding scheme (MCS) used for the transmission. Certain transmissions, however, may not benefit from an increased MCS rate, e.g., small data transmissions.

The described features generally relate to improved techniques for beamformed transmissions and user equipment (UE) set selection. Aspects of the disclosure are initially described in the context of a wireless communication system. Broadly, a base station is configured to use directional transmissions having different beamform widths to sets of UEs and to individual UEs. For example, the base station may select UEs within its coverage area to be in a set based on the UEs' channel metrics, data needs, etc. The base station may transmit control messages to the set of UEs in a directional transmission having a beamform width. The beamform width may be wide enough to provide reception and decodability of the control messages (e.g., scheduling assignment information, acknowledgement procedures information, etc.). The base station may then exchange data messages (e.g., uplink (UL) data received from the UE and/or downlink (DL) data transmitted to the UE) with individual UEs using directional transmissions. The beamform width of the directional transmission used for data messages may be different from the beamform width used for control messages. For example, the data message beamform width may be more narrow than the control message beamform width to provide higher MCS rates to the individual UEs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. In addition, features described with respect to some examples may be combined in other examples.

Figure 1:
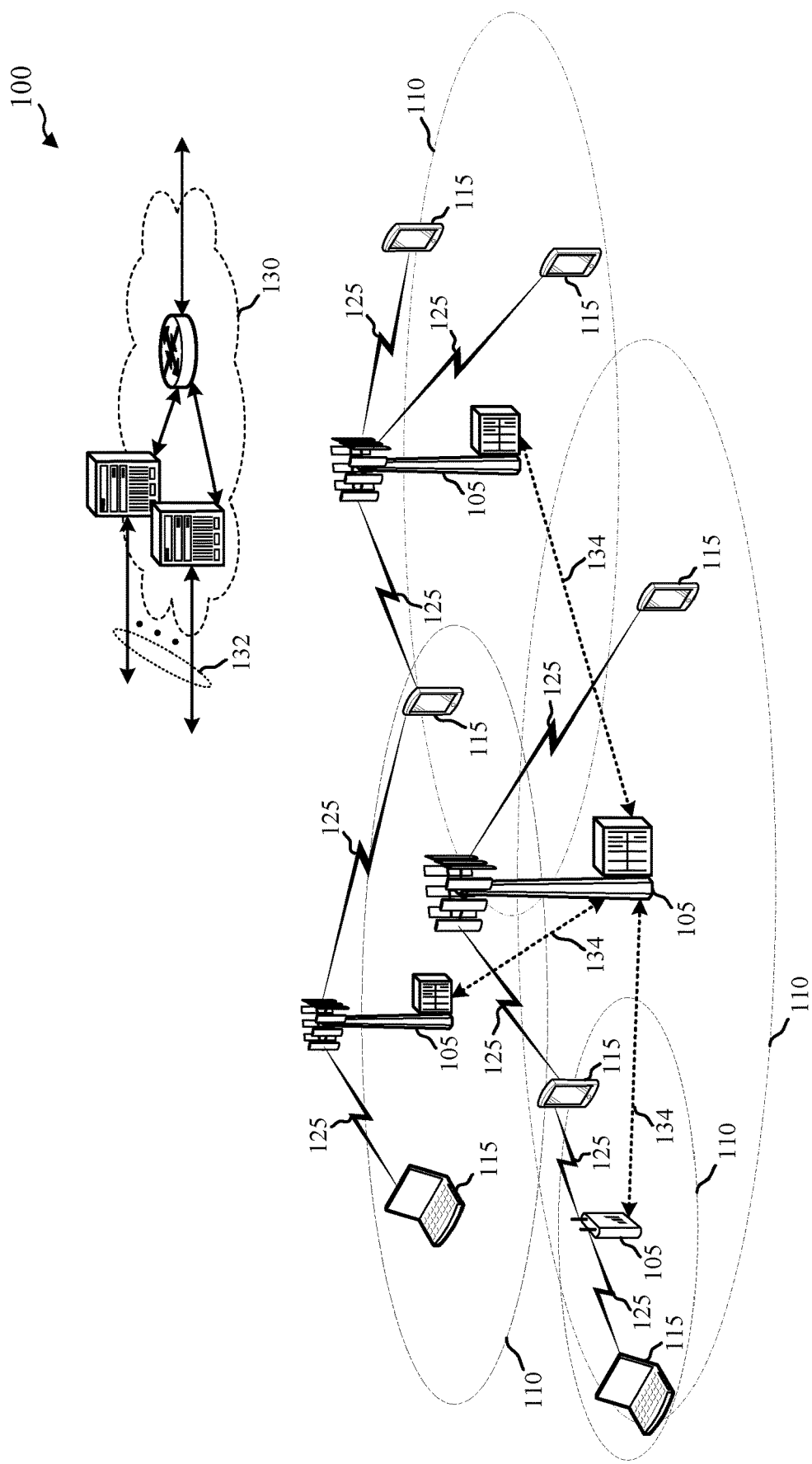
FIG. 1 shows a block diagram of a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that may be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a hand-held device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may support directional transmissions. For example, base stations 105 and/or UEs 115 may be configured with more than one antenna (e.g., an antenna array), where selection of particular antennas, antenna gain, etc., operate to transmit signals in a directional or beamformed manner. The beamform width and/or the direction of the directional transmission may be controlled by the base station 105 and/or UE 115. In some aspects, a base station 105 may determine the location of UEs within its geographic coverage area 110 based on feedback information received from the UEs 115, e.g., based on an angle of arrival parameter associated with transmissions received from the UEs 115.

Wireless communications system 100 may support beam widening and UE 115 grouping during DL control transmissions. For example, a base station 105 identify sets of UEs 115 within its geographic coverage area 110. The UEs 115 may be identified for a set based on the UEs' 115 location, channel conditions, data demand, etc. The base station 105 may transmit user-specific control message(s) to the set of UEs 115 in a directional transmission having a beamform width. The user-specific control message beamform width may be selected to ensure reception of the user-specific control message by each UE 115 in the set of UEs 115. In some cases, the user-specific control message may include control data that is specific to a particular UE 115. In some cases, the user-specific control message may be communicated via a Physical Downlink Control Channel (PDCCH). The base station 105 may then exchange data messages with each UE 115 in the set of UEs 115 using directional transmissions having a beamform width. For example, the base station 105 may exchange data messages with a first UE 115 using a first beamform width, exchange data messages with a second UE 115 using a second beamform width, and so forth. The data message beamform widths may be the same or different from each other. Further, the data message beamform widths may be different from the control message beamform width, e.g., more narrow. In some aspects, the control message beamform width is wider than the data message beamform widths.

Figure 2A:
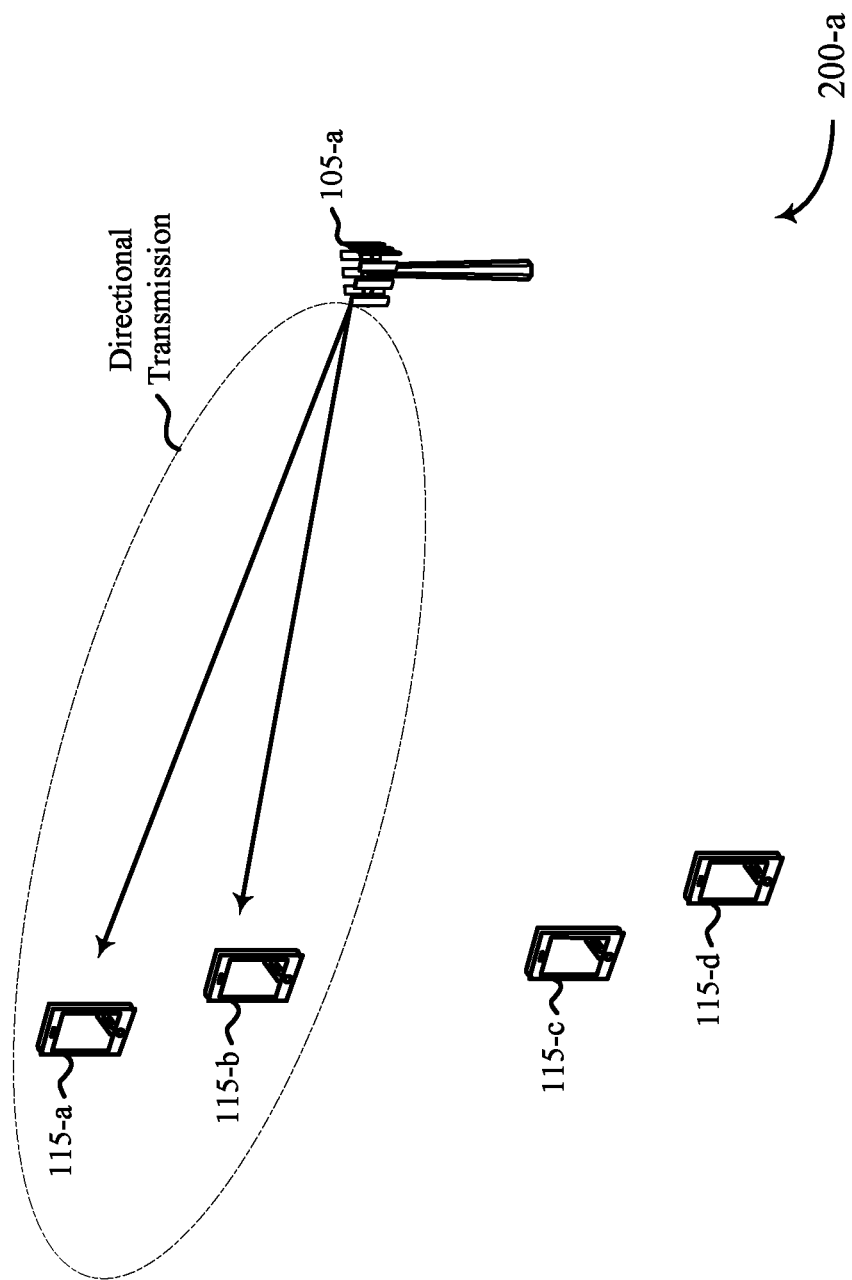
FIGS. 2A through 2C show block diagrams of a wireless communication system that support beamforming and user equipment group selection, in accordance with various aspects of the present disclosure.
Figure 2B:
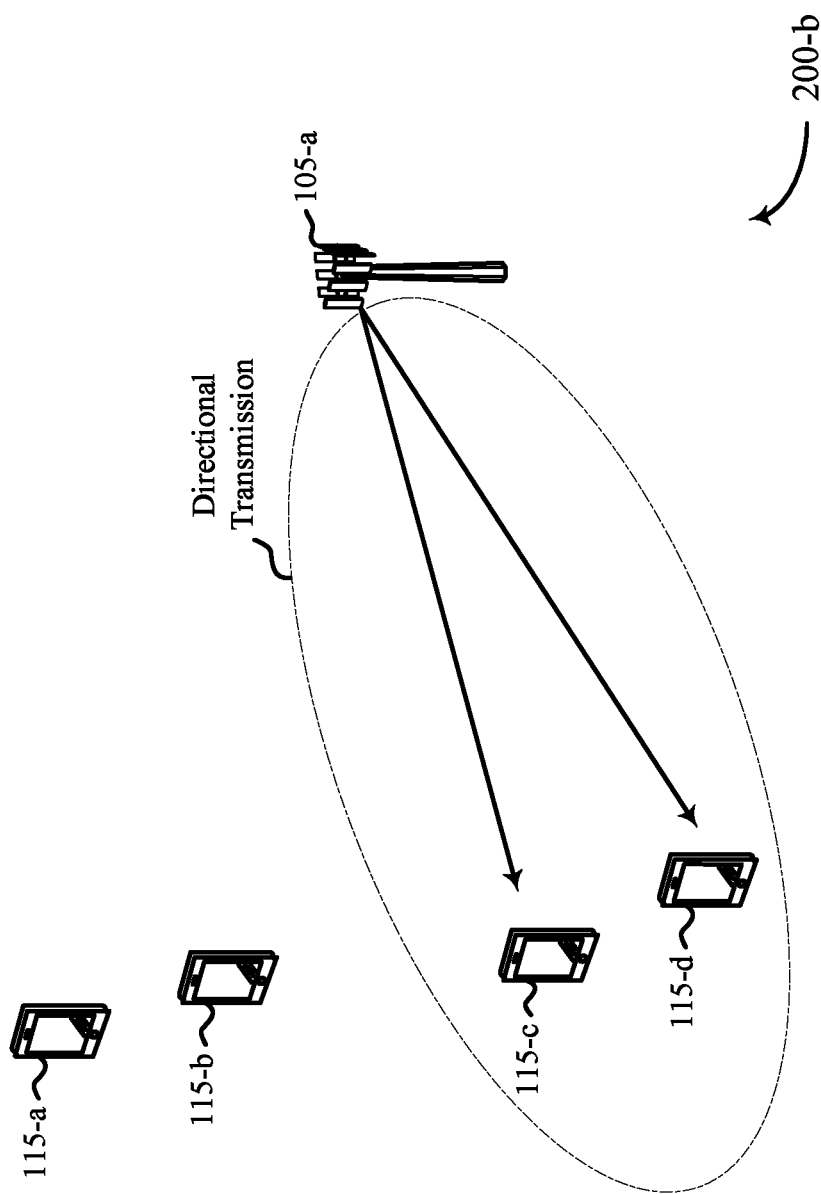
Figure 2C:
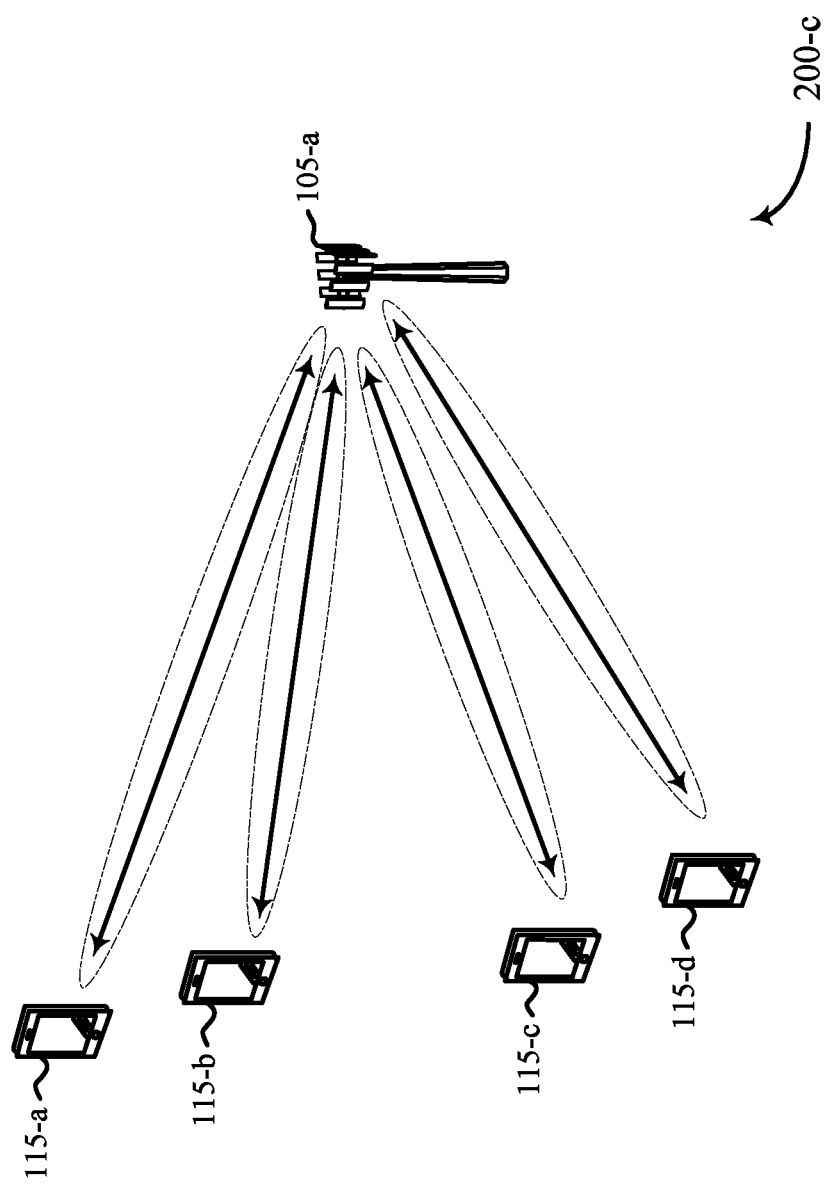

Referring now to FIGS. 2A-2C, diagrams of a wireless communication system 200 are shown. The wireless communication system 200 implement aspects of the wireless communications system 100 of FIG. 1. Wireless communication system may include a base station 105-*a*, UE 115-*b*, UE 115-*c*, and UE 115-*d*. The UEs 115-*a* through UE 115-*d* may be examples of the UE 115 described with reference to FIG. 1. The base station 105-*a* may be an example of the base station 105 described with reference to FIG. 1. The wireless communication system 200 may illustrate aspects of base station 105-*a* grouping UEs 115 into sets and using directional transmissions for communications.

Base station 105-*a* may group UEs 115 into sets according to a variety of metrics. For example, base station 105-*a* may group UE 115-*a* and UE 115-*b* into a first set and group UE 115-*c* and UE 115-*d* into a second set. Base station 105-*a* may select UEs 115 for a set based on various factors. In some aspects, base station 105-*a* may select UEs 115 for a set dependent upon a channel metric associated with each UE 115 that is located in its coverage area. The channel metric may include an angle of arrival parameter associated with transmissions from each UE 115. For example, each UE 115 may be located in a different area of the coverage area and therefore transmissions from the UE 115 will arrive at base station 105-*a* from different angles. Base station 105-*a* may receive the transmissions and determine the angle of arrival based on receive signal strength for each antenna element, as one example. In some aspects, the channel metric may comprise an angle of departure parameter associated with transmissions to each of the plurality of UEs.

In some aspects, the channel metric may include a signal-to-noise ratio (SNR) associated with each UE 115. For example, the base station 105-*a* may determine the SNR for UEs 115 during transmissions and identify UEs 115 that are located in a similar area and are experiencing similar channel conditions. The base station 105-*a* may therefore use a similar MCS for directional transmissions to the set of UEs 115. In some aspects, the base station 105-*a* may group UEs 115 into a set based on the data demand for each UE. For example, the base station 105-*a* may identify UEs 115 that have data schedule for reception (e.g., DL data) and/or transmission (e.g., UL data) and group such UEs 115 into a set.

In some aspects, the channel metric may include one or more received signal strength indicators (RSSIs). An RSSI may refer to a measurement of the power present in a received radio signal. A carrier RSSI may measure the average total received power observed in OFDM symbols containing reference symbols for an antenna port in the measurement bandwidth over N resource blocks. In some aspects, the channel metric may include a reference signal received power (RSRP). The RSRP may refer to the average power of resource elements that carry cell specific reference signals over the entire bandwidth. In some aspects, the channel metric may include a reference signal received quality (RSPQ). The RSPQ may indicate the quality of the received reference signal and may provide additional information when RSRP is not sufficient to make a reliable handover or cell re-selection decision.

In some aspects, the base station 105-*a* may receive feedback information from UEs 115 and group the UEs 115 into a set of UEs 115 based on the feedback information. The feedback information may include directional information for the particular UE 115. Directional information may include a physical location of the UE 115, a location of the UE 115 with respect to base station 105-*a* (e.g., a transmission angle from the UE 115 to base station 105-*a*), a cell identification information for the UE 115, a measurement of the SNR of the link between the base station 105-*a* and the UE 115, etc. The base station 105-*a* may receive the feedback information on a directional random access channel. The feedback information may be received in a channel quality indicator (CQI) feedback message.

In some aspects, the base station 105-*a* may receive the feedback information responsive to transmissions from the base station 105-*a*. For example, the base station 105-*a* may transmit a directional signal to the UEs 115. The UEs 115 may transmit the feedback information to the base station 105-*a* in response to the transmitted directional signals. An example of a directional signal may include a directional primary synchronization signal (PSS). The directional PSS may be transmitted by the base station 105-*a* in different time slots. The base station 105-*a* may select UEs 115 for a set of UEs 115 based on the received feedback information.

In another example, the base station 105-*a* may transmit a directional tracking message to the UEs 115 within its coverage area. The directional tracking message may include a request for the UEs 115 to transmit feedback information to the base station 105-*a*. The UEs 115 receiving the directional tracking message may respond by transmitting the feedback information to the base station 105-*a*. Base station 105-*a* may select UEs 115 for the set of UEs 115 based on the received feedback information. In some examples, the base station 105-*a* may determine a location information for the UEs 115 based on the received feedback information. For example, the base station 105-*a* may know which direction the directional tracking message has been transmitted, know the beamform width of the directional tracking message, and determine that UEs 115 responding with feedback information are located within the coverage area of the beamform width.

Thus, base station 105-*a* may select sets of UEs 115 from the UEs 115 within its coverage area based on the UEs' 115 channel metric, data demand, feedback information, location, etc., alone or in any combination. In the example wireless communication system 200, the base station 105-*a* has selected UEs 115-*a* and 115-*b* as a set of UEs 115 and selected UEs 115-*c* and 115-*d* as a second set of UEs 115. The base station 105-*a* may transmit control information to a set of UEs 115 and then perform data communications with particular UEs 115 within the set.

Turning to FIG. 2A, the base station 105-*a* transmits a control message to the set of UEs 115 consisting of UE 115-*a* and UE 115-*b*. The control message may be transmitted in a directional transmission (e.g., a beamformed transmission) that has a beamform width. The beamform width may be selected to provide reception and decodability of the control message by UEs 115-*a* and 115-*b*. The control message may convey scheduling assignment information (e.g., UL, DL, or both), acknowledgement/negative-acknowledgement (ACK/NACK) information, and the like. The control message may be transmitted in a time slot. The information included in the control messages may be smaller than a conventional data message transmission and, therefore, the control message may be transmitted in a directional transmission having a wider bandwidth, e.g., a lower MCS may be suitable to carry the smaller payload of the control messages.

Turning to FIG. 2B, the base station 105-*a* transmits a control message to the set of UEs 115 consisting of UE 115-*c* and UE 115-*d*. The control message may be transmitted in a directional transmission (e.g., a beamformed transmission) that has a beamform width. The beamform width may be selected to provide reception and decodability of the control message by UEs 115-*c* and 115-*d*. The control message may convey scheduling assignment information (e.g., UL, DL, or both), acknowledgement/negative-acknowledgement (ACK/NACK) information, and the like. The control message may be transmitted in a time slot. The information included in the control messages may be smaller than a conventional data message transmission and, therefore, the control message may be transmitted in a directional transmission having a wider bandwidth, e.g., a lower MCS may be suitable to carry the smaller payload of the control messages.

Turning to FIG. 2C, the base station 105-*a* exchanges data messages with the UEs 115 in the sets of UEs 115. For example, the base station 105-*a* may exchange data messages by receiving data messages from the UEs 115 (e.g., UL data messages), transmitting data messages to the UEs 115 (e.g., DL data messages), or both. The data messages are exchanged with the UEs 115 using directional transmissions having a beamform width. For example, the data message exchange between UE 115-*a* and base station 105-*a* may use a directional transmission having a first beamform width, the data message exchange between UE 115-*b* and base station 105-*a* may use a directional transmission having a second beamform width, and so on. The beamform widths of the directional transmissions used for data message exchanges may be the same for all UEs 115, may be the same for some of the UEs 115, and/or may be different for each UE 115. For example, base station 105-*a* may exchange data messages with UE 115-*a* using a directional transmission having a first beamform width, exchange data messages with UE 115-*b* using a directional transmission having a second beamform width, where the first and second beamform widths are the same or different.

The beamform widths of the directional transmissions used for data message exchanges may be different from the beamform width of the directional transmission used for the control messages. For example, the first and/or the second beamform widths may be different from the beamform width used for transmitting the control messages. In some aspects, the beamform widths for the data message exchange are more narrow than the beamform width used for the control message transmission. As illustrated in FIG. 2C, the beamform width of the directional transmission used for data message exchange between UE 115-*a* and base station 105-*a* may be narrow such that only UE 115-*a* may receive the data messages. In contrast and as illustrated in FIG. 2A, the beamform width of the directional transmission used for the control message transmission may be wider such that UEs 115-*a* and 115-*b* may both receive the control message transmission. As also illustrated in FIG. 2C, the beamform widths of the directional transmissions for the data message exchanges with UEs 115-*b*, 115-*c*, and 115-*d* may be narrow such that the particular UE 115 may receive its respective data messages.

The data messages exchanged between base station 105-*a* and UEs 115 may occur during the same time slot and/or in different time slots. For example, base station 105-*a* may exchange data messages with UEs 115-*a* and 115-*b* in the same time slot (e.g., receive and/or transmit data messages from the UEs 115 at the same time). As another example, base station 105-*a* may exchange data messages with UEs 115-*a* and 115-*b* in different time slots. Base station 105-*a* exchanges data messages with the respective UEs 115 according to the information included in the transmitted control messages.

Figure 3:
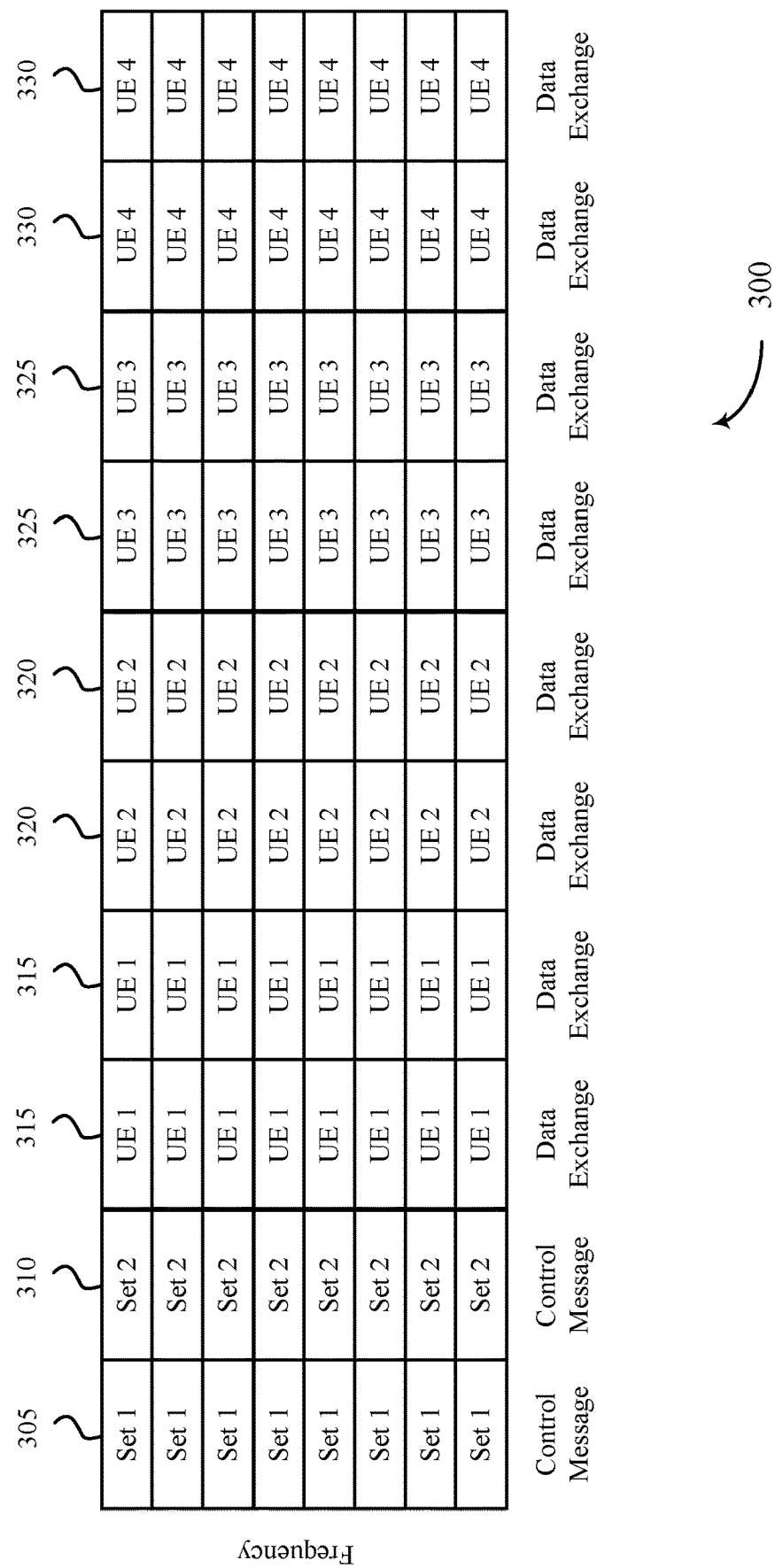
FIG. 3 shows an example of aspects of wireless communications that support beamforming and user equipment group selection, in accordance with various aspects of the present disclosure.

Referring now to FIG. 3, an example timing diagram 300 for wireless communications is shown. The timing diagram 300 may be implemented according to wireless communications systems 100 and/or 200 of FIGS. 1 and 2, respectively. In some examples, a base station 105 and/or a UE 115, such as described with reference to FIGS. 1 and/or 2 may implement aspects of timing diagram 300. The timing diagram 300 illustrates an example of wireless communications where the data messages are exchanged with different UEs in different time slots.

During a time slot 305, a base station 105 may transmit a control message to a set of UEs 115, such as UEs 115-*a* and 115-*b* as illustrated in FIG. 2A. During time slot 310, a base station 105 may transmit a control message to a second set of UEs 115, such as UEs 115-*c* and 115-*d* as illustrated in FIG. 2B. As discussed, the control messages may include scheduling assignment information, ACK/NACK information, etc.

Subsequently, the base station 105 may exchange data messages with each UE 115 of the set of UEs 115. For example and during time slots 315, the base station 105 may exchange data messages with a first UE, such as UE 115-*a*. During time slots 320, the base station 105 may exchange data messages with a second UE, such as UE 115-*b*. Base station 105 may exchange data messages with third and fourth UEs during time slots 325 and 330, such as UEs 115-*c* and 115-*d*, respectively. The data messages may be exchanged according to the information included in the control messages transmitted to the respective UE. As also discussed, the control messages may be transmitted using directional transmissions having a beamform width that is narrower than the beamform width of the directional transmission used for data message exchanges.

Figure 4:
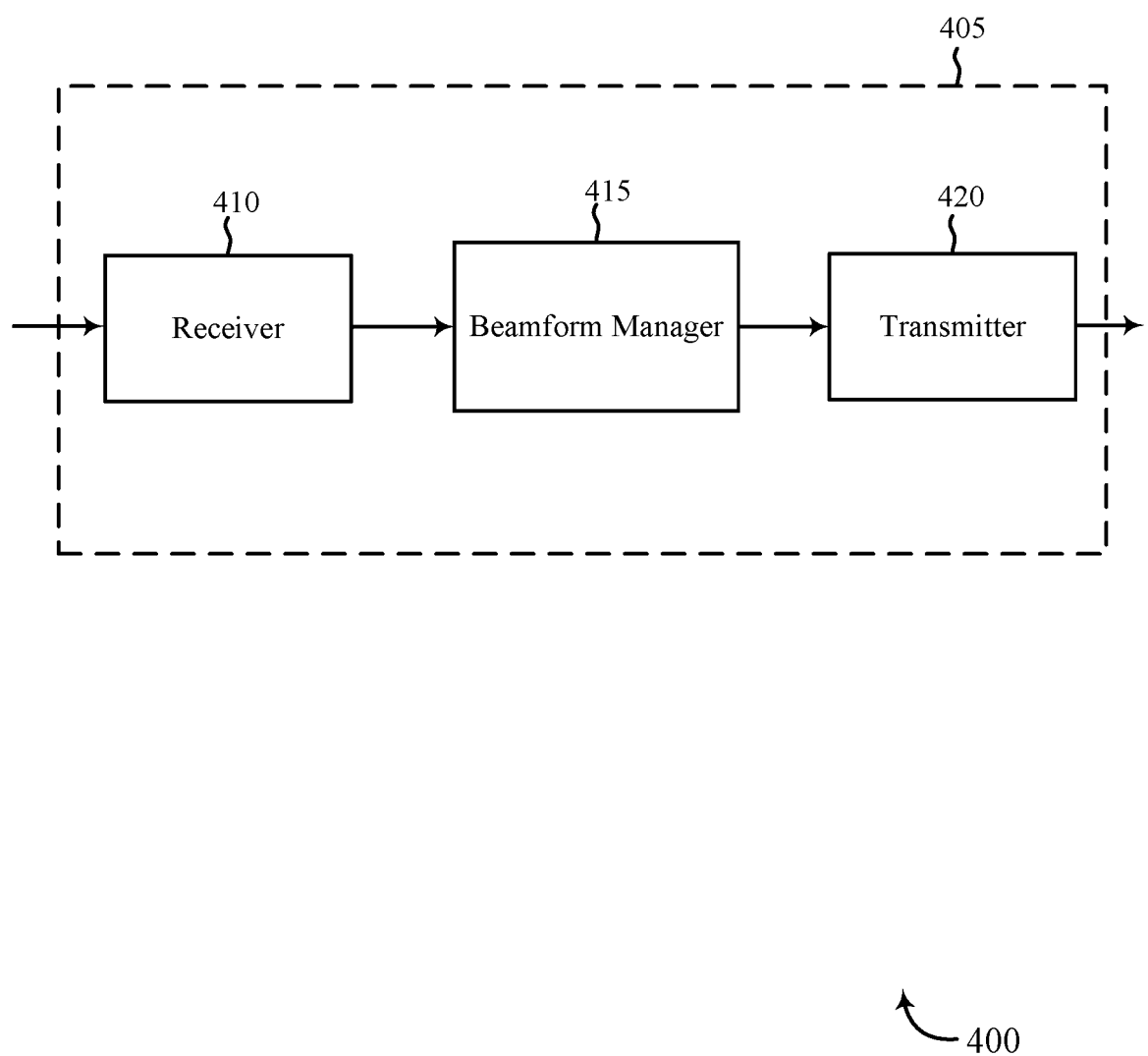
FIG. 4 shows a block diagram of an apparatus for use in wireless communication, in accordance with various aspects of the present disclosure.

FIG. 4 shows a block diagram 400 of an apparatus 405 for use in wireless communication, in accordance with various aspects of the present disclosure. In some examples, the apparatus 405 may be an example of aspects of one or more of the base stations 105 described with reference to FIGS. 1-2. In some examples, the apparatus 405 may be part or include an LTE/LTE-A eNB and/or an LTE/LTE-A base station. The apparatus 405 may also be a processor. The apparatus 405 may include a receiver 410, a beamform manager 415, and/or a transmitter 420. Each of these components may be in communication with each other.

The components of the apparatus 405 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver 410 may include at least one radio frequency (RF) receiver, such as an RF receiver operable to receive feedback signals, directional information, data messages, etc., from UEs 115 according to aspects of the present disclosure. The receiver 410 may be used to receive various types of data and/or control signals (i.e., transmissions) over one or more communication links of a wireless communication system, such as one or more communication links of the wireless communications system 100 described with reference to FIG. 1.

In some examples, the transmitter 420 may include at least one RF transmitter, such as at least one RF transmitter operable to transmit control messages, data messages, etc., according to aspects of the present disclosure. The transmitter 420 may be used to transmit various types of data and/or control signals (i.e., transmissions) over one or more communication links of a wireless communication system, such as one or more communication links of the wireless communications system 100 described with reference to FIG. 1.

In some examples, the beamform manager may monitor, control, provide a means for, other otherwise manage aspects of beamforming and UE set selection. For example, the beamform manager 415 may, in cooperation with the transmitter 420, transmit a control message to a set of UEs using a directional transmission having a first beamform width. The beamform manager 415 may, in cooperation with the receiver 410 and/or the transmitter 420, exchange data messages with a first UE of the set of UEs using a directional transmission having a second beamform width which is different from the first beamform width. The beamform manager 415 may, in cooperation with the receiver 410 and/or the transmitter 420, exchange data messages with a second UE of the set of UEs using a directional transmission having a third beamform width which is different from at least one of the first beamform width and/or the second beamform width.

Figure 5:
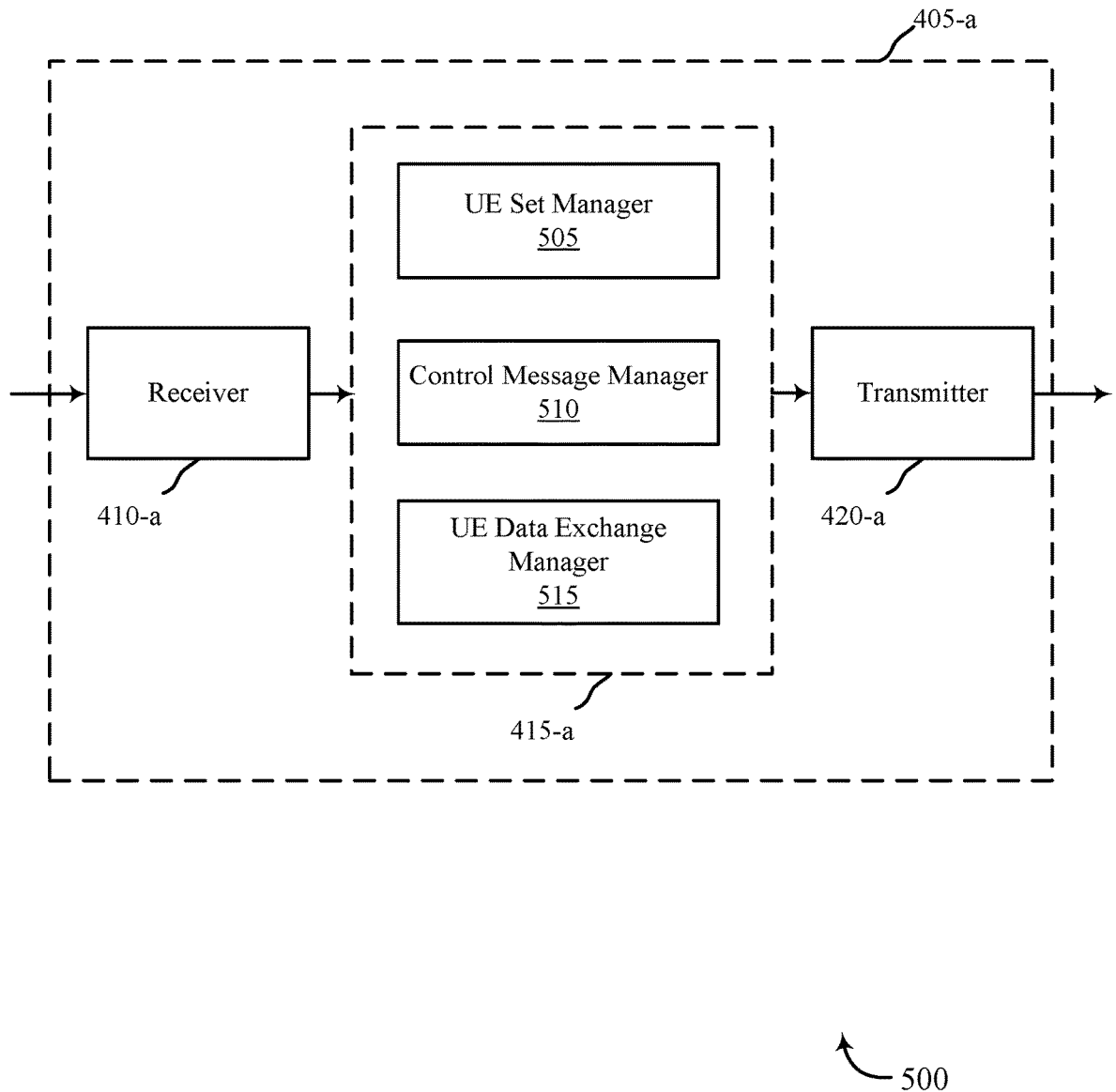
FIG. 5 shows a block diagram of an apparatus for use in wireless communication, in accordance with various aspects of the present disclosure.

FIG. 5 shows a block diagram 500 of an apparatus 405-a for use in wireless communication, in accordance with various aspects of the present disclosure. In some examples, the apparatus 405-a may be an example of aspects of one or more of the base stations 105 described with reference to FIGS. 1-2, and/or an example of aspects of the apparatus 405 described with reference to FIG. 4. In some examples, the apparatus 405-a may be part or include an LTE/LTE-A eNB and/or an LTE/LTE-A base station. The apparatus 405-a may also be a processor. The apparatus 405-a may include a receiver 410-a, a beamform manager 415-a, and/or a transmitter 420-a. The receiver 410-a and the transmitter 420-a may be an example of, and perform the functions of the receiver 410 and the transmitter 420, respectively, described with reference to FIG. 4. The beamform manager 415-a may include a UE set manager 505, a control message manager 510, and a UE data exchange manager 515. Each of these components may be in communication with each other.

The UE set manager 505 may monitor, control, provide a means for, or otherwise manage aspects of selecting a set of UEs from a plurality of UEs in a coverage area of the apparatus 405-a. The UE set manager 505 may select the set of UEs based at least in part on a channel metric associated with the plurality of UEs in a cell coverage area. The channel metric may include an angle of arrival parameter associated with transmissions from the plurality of UEs. The channel metric may include a SNR associated with transmissions from the plurality of UEs.

The UE set manager 505 may select the set of UEs based at least in part on a data demand associated with the plurality of UEs in the cell coverage area. The UE set manager 505 may receive, from each of a plurality of UEs, a feedback message including directional information for each of the plurality of UEs. The UE set manager 505 may select the set of UEs based at least in part on the directional information. The feedback message may be received in a directional random access channel. The feedback message may be received in a CQI feedback message. The feedback message may be received through uplink control information (UCI). In some aspects, the feedback message may be received via a physical uplink control channel (PUCCH). In some aspects, the feedback message may be received via a physical uplink shared channel (PUSCH).

The UE set manager 505 may transmit one or more directional PSSs to the plurality of UEs and receive feedback information from each of the plurality of UEs, the feedback information based at least in part on the one or more directional PSSs. The UE set manager 505 may select the set of UEs based at least in part on the feedback information.

The UE set manager 505 may transmit one or more directional tracking messages to corresponding individual UEs of the plurality of UEs, the one or more directional tracking messages each conveying a request to the corresponding UEs to provide feedback information. The UE set manager 505 may receive, responsive to the one or more directional tracking messages, feedback information from each of the corresponding individual UEs and select the set of UEs based at least in part on the feedback information.

The control message manager 510 may monitor, control, provide a means for, or otherwise manage aspects of control message transmission for the apparatus 405-a. The control message manager 510 may transmit a control message to the set of UEs using a directional transmission having a first beamform width. The control message may be a user-specific or UE-specific control message communicated via the PDCCH of the wireless communications system 100.

The UE data exchange manager 515 may monitor, control, provide a means for, or otherwise manage aspects of data message exchanges for the apparatus 405-a. The UE data exchange manager 515 may exchange data messages with a first UE of the set of UEs using a directional transmission having a second beamform width. The second beamform width may be different from the first beamform width. The UE data exchange manager 515 may exchange data messages with a second UE of the set of UEs using a directional transmission having a third beamform width. The third beamform width may be different from at least one of the first beamform width and the second beamform width. The second beamform width and the third beamform width may be narrower than the first beamform width. The data messages exchanged with the second UE may be exchanged in a different time slot than the data messages exchanged with the first UE. The data messages exchanged with the second UE may be exchanged in the same time slot than the data messages exchanged with the first UE.

Figure 6:
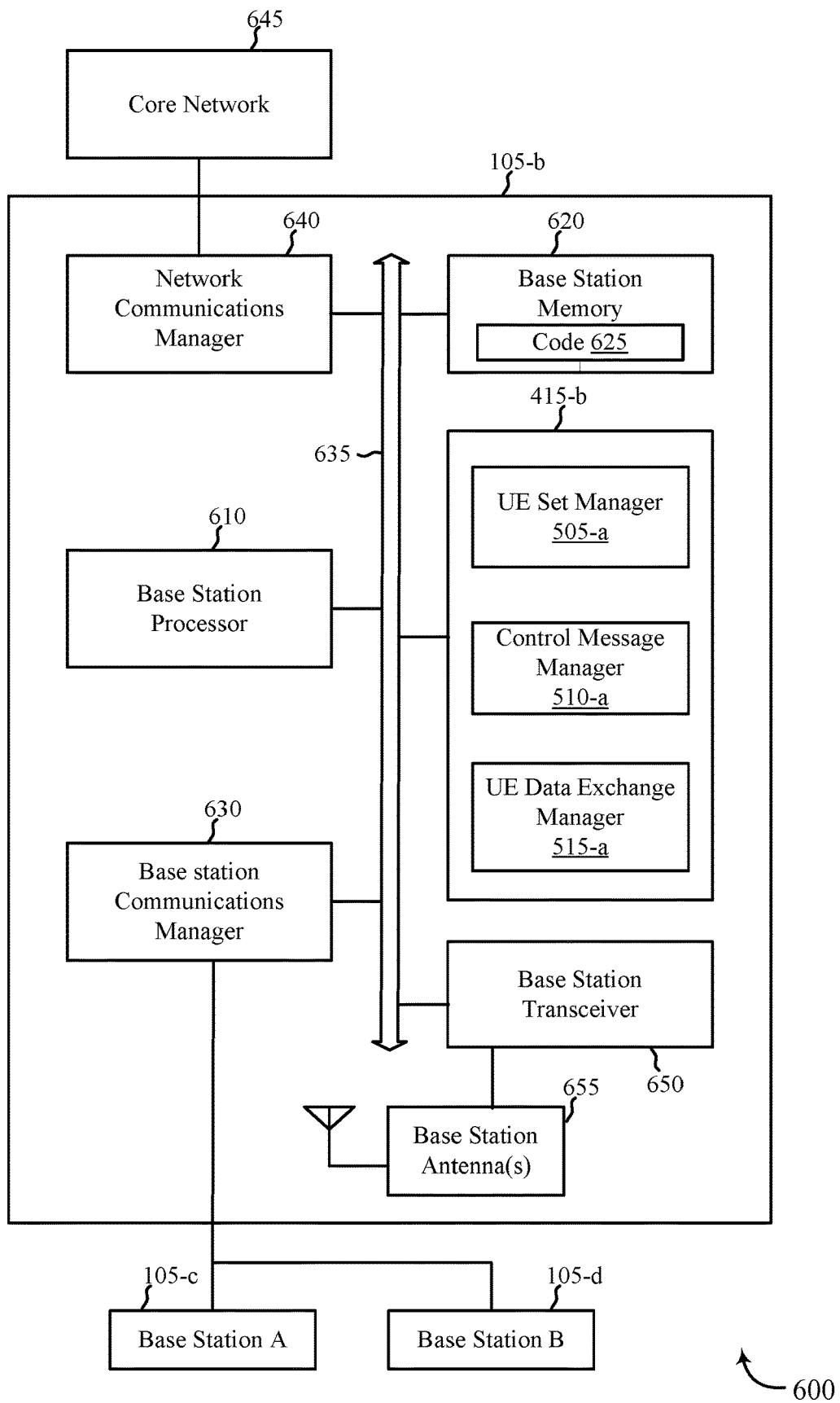
FIG. 6 shows a block diagram of a base station (e.g., a base station forming part or all of an evolved NodeB (eNB) for use in wireless communication, in accordance with various aspects of the present disclosure.

FIG. 6 shows a block diagram 600 of a base station 105-b (e.g., a base station forming part or all of an eNB) for use in wireless communication, in accordance with various aspects of the present disclosure. In some examples, the base station 105-b may be an example of aspects of one or more of the base stations 105 described with reference to FIGS. 1-2, and/or aspects of one or more of the apparatus 405 when configured as a base station, as described with reference to FIGS. 4 and/or 5. The base station 105-b may be configured to implement or facilitate at least some of the base station and/or apparatus features and functions described with reference to FIGS. 1-3.

The base station 105-b may include a base station processor 610, a base station memory 620, at least one base station transceiver (represented by base station transceiver 650), at least one base station antenna (represented by base station antenna(s) 655), and/or a beamform manager 415-b. The base station 105-b may also include one or more of a base station communications manager 630 and/or a network communications manager 640. Each of these components may be in communication with each other, directly or indirectly, over one or more buses 635.

The base station memory 620 may include random access memory (RAM) and/or read-only memory (ROM). The base station memory 620 may store non-transitory computer-readable, computer-executable software/firmware code 625 containing instructions that are configured to, when executed, cause the base station processor 610 to perform various functions described herein related to wireless communication (e.g., beamforming transmissions of control messages, data messages, etc.). Alternatively, the non-transitory computer-readable, computer-executable software/ firmware code 625 may not be directly executable by the base station processor 610 but be configured to cause the base station 105-*b* (e.g., when compiled and executed) to perform various of the functions described herein.

The base station processor 610 may include an intelligent hardware device, e.g., a central processing unit (CPU), a microcontroller, an ASIC, etc. The base station processor 610 may process information received through the base station transceiver 650, the base station communications manager 630, and/or the network communications manager 640. The base station processor 610 may also process information to be sent to the base station transceiver 650 for transmission through the antenna(s) 655, to the base station communications manager 630, for transmission to one or more other base stations 105-*c* and 105-*d*, and/or to the network communications manager 640 for transmission to a core network 645, which may be an example of one or more aspects of the core network 130 described with reference to FIG. 1. The base station processor 610 may handle, alone or in connection with the beamform manager 415-*b*, various aspects of UE set selection and directional transmissions having beamform widths.

The base station transceiver 650 may include a modem configured to modulate packets and provide the modulated packets to the base station antenna(s) 655 for transmission, and to demodulate packets received from the base station antenna(s) 655. The base station transceiver 650 may, in some examples, be implemented as one or more base station transmitter modules and one or more separate base station receiver modules. The base station transceiver 650 may support communications in a first radio frequency spectrum band and/or a second radio frequency spectrum band. The base station transceiver 650 may be configured to communicate bi-directionally, via the antenna(s) 655, with one or more UEs or apparatuses, such as one or more of the UEs 115 described with reference to FIGS. 1-3. The base station 105-*b* may, for example, include multiple base station antennas 655 (e.g., an antenna array used for directional transmissions). The base station 105-*b* may communicate with the core network 545 through the network communications manager 640. The base station 105-*b* may also communicate with other base stations, such as the base stations 105-*c* and 105-*d*, using the base station communications manager 630.

The beamform manager 415-*b* may be configured to perform and/or control some or all of the features and/or functions described with reference to FIGS. 1-3 related to UE set selection and control/data message beamforming. The beamform manager 415-*b*, or portions of the beamform manager 415-*b*, may include a processor, and/or some or all of the functions of the beamform manager 415-*b* may be performed by the base station processor 610 and/or in connection with the base station processor 610. In some examples, the beamform manager 415-*b* may be an example of the beamform manager 415 and/or 415-*a* described with reference to FIGS. 4 and/or 5. For example, the beamform manager 415-*b* may include a UE set manager 505-*a*, a control message manager 510-*a*, and a UE data exchange manager 515-*a*, which may be examples of and implement the functions of the UE set manager 505, the control message manager 510, and the UE data exchange manager 515, respectively, described with reference to FIG. 5.

Figure 7:
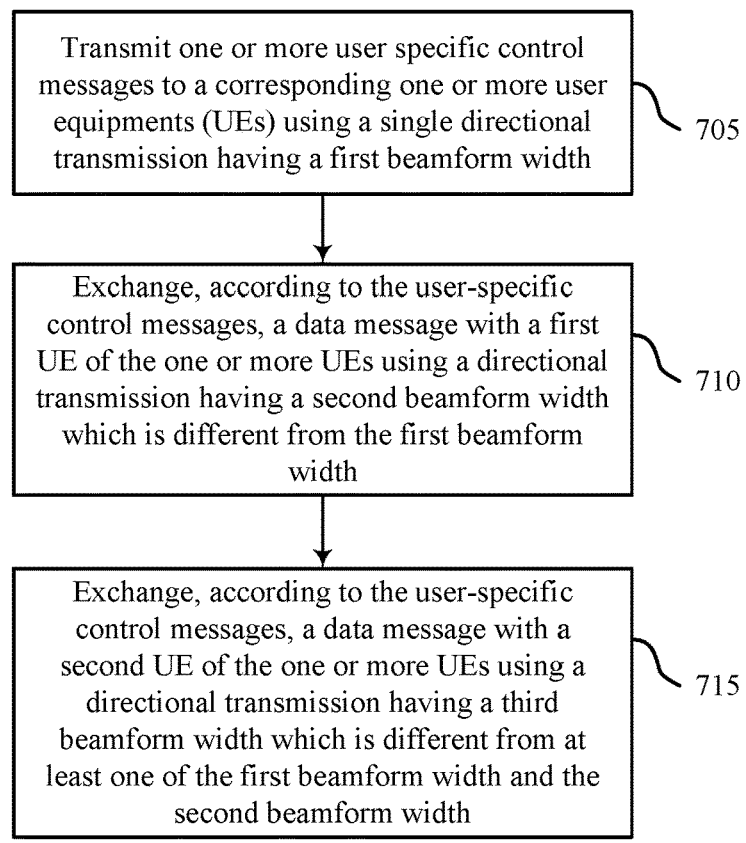
FIGS. 7 and 8 illustrate methods for wireless communication, in accordance with various aspects of the present disclosure.

FIG. 7 is a flow chart illustrating an example of a method 700 for wireless communication, in accordance with various aspects of the present disclosure. For clarity, the method 700 is described below with reference to aspects of one or more of the base stations 105 described with reference to FIGS. 1-3 and 6, and/or aspects of one or more of the apparatuses 405 described with reference to FIGS. 4-5. In some examples, a base station may execute one or more sets of codes to control the functional elements of the base station to perform the functions described below. Additionally or alternatively, the base station may perform one or more of the functions described below using special-purpose hardware.

At block 705, the method 700 may include the base station transmitting one or more user-specific control messages to a corresponding one or more UEs using a single directional transmission having a first beamform width. The operation(s) at block 705 may be performed using the control message manager 510 described with reference to FIGS. 5 and 6.

At block 710, the method 700 may include the base station exchanging, according to the user-specific control messages, a data message with a first UE of the one or more UEs using a directional transmission having a second beamform width which is different from the first beamform width. The operation(s) at block 710 may be performed using the UE data exchange manager 515 described with reference to FIGS. 5 and 6.

At block 715, the method 700 may include the base station exchanging, according to the user-specific control messages, a data message with a second UE of the one or more UEs using a directional transmission having a third beamform width which is different from at least one of the first beamform width and the second beamform width. The operation(s) at block 715 may be performed using the UE data exchange manager 515 described with reference to FIGS. 5 and 6.

Figure 8:
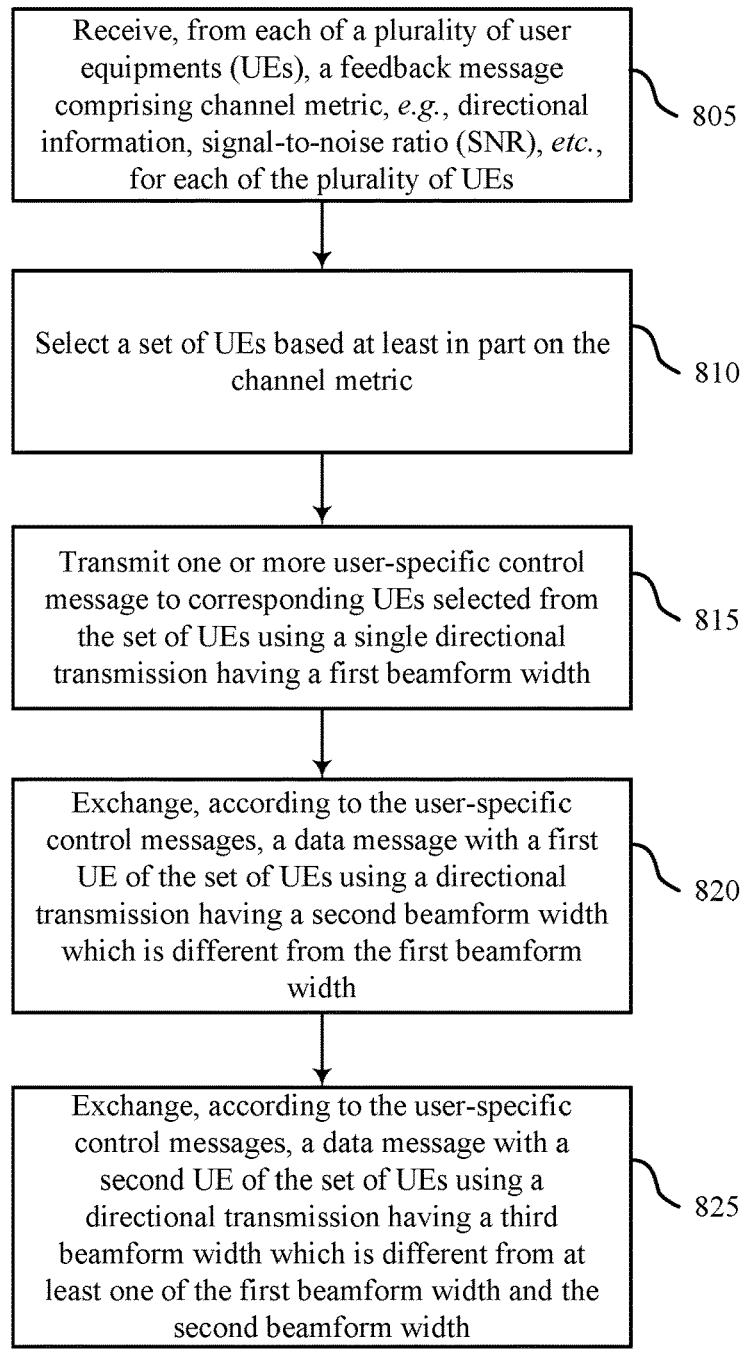

FIG. 8 is a flow chart illustrating an example of a method 800 for wireless communication, in accordance with various aspects of the present disclosure. For clarity, the method 800 is described below with reference to aspects of one or more of the base stations 105 described with reference to FIGS. 1-3 and 6, and/or aspects of one or more of the apparatuses 405 described with reference to FIGS. 4-5. In some examples, a base station may execute one or more sets of codes to control the functional elements of the base station to perform the functions described below. Additionally or alternatively, the base station may perform one or more of the functions described below using special-purpose hardware.

At block 805, the method 800 may include the base station receiving, from each of a plurality of UEs, a feedback message comprising a channel metric, e.g., directional information, SNR of the link, data demand for each of the plurality of UEs, etc. The operation(s) at block 805 may be performed using the UE set manager 505 described with reference to FIGS. 5 and 6.

At block 810, the method 800 may include the base station selecting a set of UEs based at least in part on the channel metric. The operation(s) at block 810 may be performed using the UE set manager 505 described with reference to FIGS. 5 and 6.

At block 815, the method 800 may include the base station transmitting one or more user-specific control messages to corresponding UEs selected from the set of UEs using a single directional transmission having a first beamform width. The operation(s) at block 815 may be performed using the control message manager 510 described with reference to FIGS. 5 and 6.

At block 820, the method 800 may include the base station exchanging, according to the user-specific control messages, a data message with a first UE of the set of UEs using a directional transmission having a second beamform width which is different from the first beamform width. The operation(s) at block 820 may be performed using the UE data exchange manager 515 described with reference to FIGS. 5 and 6.

At block 825, the method 800 may include the base station exchanging, according to the user-specific control messages, a data message with a second UE of the set of UEs using a directional transmission having a third beamform width which is different from at least one of the first beamform width and the second beamform width. The operation(s) at block 825 may be performed using the UE data exchange manager 515 described with reference to FIGS. 5 and 6.

Thus, the methods 700 and 800 may provide for wireless communication. It should be noted that the methods 700 and 800 are just example implementations and that the operations of the methods may be rearranged or otherwise modified such that other implementations are possible. In some examples, aspects from the methods 700 and 800 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination. As used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may comprise RAM, ROM, EEPROM, flash memory, CD-ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

What is claimed is:

1. A method for wireless communication, comprising:
   receiving from each of a plurality of User Equipments (UEs) a feedback message via one or more antenna elements, each feedback message indicative of a channel metric indicating directional information for a respective UE, the directional information including an angle of arrival parameter determined based at least in part on a received signal strength for each respective antenna element associated with transmissions from the respective UE;
   selecting a set of UEs from the plurality of UEs based at least in part on the angle of arrival parameter associated with transmissions from each of the plurality of UEs and an amount of data scheduled for each UE of the plurality of UEs;
   transmitting control messages to the selected set of UEs using a single directional transmission having a first beamform width;
   exchanging, according to the control messages, a first data message with a first UE in the set of UEs using a directional transmission having a second beamform width that is different from the first beamform width;
   exchanging, according to the control messages, a second data message with a second UE in the set of UEs using a directional transmission having a third beamform width that is different from the first beamform width.

2. The method of claim 1, further comprising:
   transmitting the one or more directional tracking messages to corresponding individual UEs of the plurality of UEs, the one or more directional tracking messages each conveying a request to the corresponding UEs to provide feedback information; and
   receiving, responsive to the one or more directional tracking messages, feedback information from each of the corresponding individual UEs;
   wherein selecting the one or more UEs is based at least in part on the feedback information.

3. The method of claim 1, wherein the data message exchanged with the second UE is exchanged in a different time slot than the data message exchanged with the first UE.

4. The method of claim 1, wherein the data message exchanged with the second UE is exchanged in a same time slot as the data message exchanged with the first UE.

5. The method of claim 1, wherein the user-specific control messages are communicated via a Physical Downlink Control Channel (PDCCH).

6. The method of claim 1 wherein the set of UEs is selected based at least in part on at least one of the following: a reference signal received power associated with transmissions to each of the plurality of UEs, a reference signal received quality associated with transmissions to each of the plurality of UEs, an angle of departure parameter associated with transmissions to each of the plurality of UEs, or a directional tracking message.

7. The method of claim 6, wherein selecting the set of UEs is based at least in part on at least one of the reference signal received power or the reference signal received quality associated with transmissions to each of the plurality of UEs.

8. The method of claim 6, wherein selecting the set of UEs is based at least in part on the angle of departure parameter associated with transmissions to each of the plurality of UEs.

9. The method of claim 6, wherein the feedback message is received in a directional random access channel.

10. The method of claim 6, wherein the feedback message is received through uplink control information (UCI).

11. The method of claim 10, wherein the UCI is received via a physical uplink control channel (PUCCH).

12. The method of claim 10, wherein the UCI is received via a physical uplink shared channel (PUSCH).

13. The method of claim 6, wherein the feedback message is received in a channel quality indicator (CQI) feedback message.

14. The method of claim 1, wherein the directional information comprises a physical location of each of the plurality of UEs.

15. The method of claim 1, wherein the directional information comprises a location of each of the plurality of UEs with respect to a base station.

16. The method of claim 1, wherein the directional information comprises a measurement of a signal-to-noise ratio (SNR) of a link between each of the plurality of UEs and a base station.

17. An apparatus for wireless communication, comprising:
   a processor;
   memory in electronic communication with the processor; and
   instructions stored in the memory, the instructions being executable by the processor to:
   receive from each of a plurality of User Equipments (UEs) a feedback message via one or more antenna elements, each feedback message indicative of a channel metric indicating directional information for a respective UE, the directional information including an angle of arrival parameter determined based at least in part on a received signal strength for each respective antenna element associated with transmissions from the respective UE;

select a set of UEs from the plurality of UEs based at least in part on the angle of arrival parameter associated with transmissions from each of the plurality of UEs and an amount of data scheduled for each UE of the plurality of UEs;

transmit control messages to the selected set of UEs using a single directional transmission having a first beamform width;

exchange, according to the control messages, a first data message with a first UE in the set of UEs using a directional transmission having a second beamform width that is different from the first beamform width; and exchange, according to the control messages, a second data message with a second UE in the set of UEs using a directional transmission having a third beamform width that is different from at least one of the first beamform width.

18. The apparatus of claim 17, wherein the instructions are further executable by the processor to:

transmit the one or more directional tracking messages to corresponding individual UEs of the plurality of UEs, the one or more directional tracking messages each conveying a request to the corresponding UEs to provide feedback information;

receive, responsive to the one or more directional tracking messages, feedback information from each of the corresponding individual UEs; and select the one or more UEs based at least in part on the feedback information.

19. The apparatus of claim 17, wherein the data message exchanged with the second UE is exchanged in a different time slot than the data message exchanged with the first UE.

20. The apparatus of claim 17, wherein the data message exchanged with the second UE is exchanged in a same time slot as the data message exchanged with the first UE.

21. The apparatus of claim 17 wherein the processor is further configured to select the set of UEs and the set of UEs are selected based at least in part on at least one of the following: a reference signal received power associated with transmissions to each of the plurality of UEs, a reference signal received quality associated with transmissions to each of the plurality of UEs, an angle of departure parameter associated with transmissions to each of the plurality of UEs, or a directional tracking message.

22. The apparatus of claim 21, wherein the instructions are further executable by the processor to:

select the set of UEs based at least in part on the directional information.

23. The apparatus of claim 22, wherein the feedback message is received in a directional random access channel.

24. The apparatus of claim 22, wherein the feedback message is received in a channel quality indicator (CQI) feedback message.

25. The apparatus of claim 22, wherein the directional information comprises a physical location of each of the plurality of UEs.

26. The apparatus of claim 22, wherein the directional information comprises a location of each of the plurality of UEs with respect to a base station.

27. The apparatus of claim 22, wherein the directional information comprises a measurement of a signal-to-noise ratio (SNR) of a link between each of the plurality of UEs and a base station.

28. An apparatus for wireless communication, comprising:

means for receiving from each of a plurality of User Equipments (UEs) a feedback message via one or more antenna elements, each feedback message indicative of a channel metric indicating directional information for a respective UE, the directional information including an angle of arrival parameter determined based at least in part on a received signal strength for each respective antenna element associated with transmissions from the respective UE;

means for selecting a set of UEs from the plurality of UEs based at least in part on the angle of arrival parameter associated with transmissions from each of the plurality of UEs and an amount of data scheduled for each UE of the plurality of UEs;

means for transmitting control messages to the selected set of UEs using a single directional transmission having a first beamform width;

means for exchanging, according to the control messages, a first data message with a first UE in the set of UEs using a directional transmission having a second beamform width that is different from the first beamform width;

means for exchanging, according to the control messages, a second data message with a second UE in the set of UEs using a directional transmission having a third beamform width that is different from the first beamform width.

29. The apparatus of claim 28 wherein the means for selecting the UE is configured to select the set of UEs and the set of UEs are selected based at least in part on at least one of the following: a reference signal received power associated with transmissions to each of the plurality of UEs, a reference signal received quality associated with transmissions to each of the plurality of UEs, an angle of departure parameter associated with transmissions to each of the plurality of UEs, directional information for each of the plurality of UEs, or a directional tracking message.

30. The apparatus of claim 28, further comprising:

means for receiving, from each of a plurality of UEs, a feedback message comprising directional information for each of the plurality of UEs;

wherein the means for selecting selects the one or more UEs based at least in part on the directional information.

31. The apparatus of claim 30, wherein the directional information comprises a physical location of each of the plurality of UEs.

32. The apparatus of claim 30, wherein the directional information comprises a location of each of the plurality of UEs with respect to a base station.

33. The apparatus of claim 30, wherein the directional information comprises a measurement of a signal-to-noise ratio (SNR) of a link between each of the plurality of UEs and a base station.

34. A non-transitory computer-readable medium storing computer-executable code for wireless communication, the code executable by a processor to:

receive from each of a plurality of User Equipments (UEs) a feedback message via one or more antenna elements, each feedback message indicative of a channel metric indicating directional information for a respective UE, the directional information including an angle of arrival parameter determined based at least in part on a received signal strength for each respective antenna element associated with transmissions from the respective UE;

select a set of UEs from the plurality of UEs based at least in part on the angle of arrival parameter associated with transmissions from each of the plurality of UEs and an amount of data scheduled for each UE of the plurality of UEs;

transmit control messages to the selected set of UEs using a single directional transmission having a first beamform width;

exchange, according to the control messages, a first data message with a first UE in the set of UEs using a directional transmission having a second beamform width that is different from the first beamform width; and exchange, according to the control messages, a second data message with a second UE in the set of UEs using a directional transmission having a third beamform width that is different from at least one of the first beamform width.

35. The non-transitory computer-readable medium of claim 34 further comprising code to select the set of UEs and the set of UEs are selected based at least in part on at least one of the following: a reference signal received power associated with transmissions to each of the plurality of UEs, a reference signal received quality associated with transmissions to each of the plurality of UEs, an angle of departure parameter associated with transmissions to each of the plurality of UEs, or a directional tracking message.

36. The non-transitory computer-readable medium of claim 34, wherein the code is executable by the processor to:
receive, from each of a plurality of UEs, a feedback message comprising directional information for each of the plurality of UEs; and
select the one or more UEs based at least in part on the directional information.

37. The non-transitory computer-readable medium of claim 36, wherein the directional information comprises a physical location of each of the plurality of UEs.

38. The non-transitory computer-readable medium of claim 36, wherein the directional information comprises a location of each of the plurality of UEs with respect to a base station.

39. The non-transitory computer-readable medium of claim 36, wherein the directional information comprises a measurement of a signal-to-noise ratio (SNR) of a link between each of the plurality of UEs and a base station.

* * * * *